April 29, 1969 R. W. MITCHELL ETAL 3,441,926

GRAPHIC DISPLAY SYSTEMS FOR CRT RESPONSIVE TO SELECTED PARTS OF PLURAL FILTERED STEP WAVEFORMS INCLUDING PRECURSOR, LINEAR AND OVERSHOOT PARTS

Filed July 3, 1966

INVENTORS
ROY WILLIAM MITCHELL
GORDON GEORGE SCARROTT
BY
Hane and Nydick
ATTORNEY INVENTORS
ROY WILLIAM MITCHELL
GORDON GEORGE SCARROTT
BY Kane and Nydick
ATTORNEY United States Patent Office 3,441,926

Patented Apr. 29, 1969

3,441,926
GRAPHIC DISPLAY SYSTEMS FOR CRT RESPONSIVE TO SELECTED PARTS OF PLURAL FILTERED STEP WAVEFORMS INCLUDING PRECURSOR, LINEAR AND OVERSHOOT PARTS

Roy William Mitchell, Bracknell, and Gordon George Scarrott, Wokingham, England, assignors to International Computers and Tabulators Limited, London, England Filed July 8, 1966, Ser. No. 563,737
Claims priority, application Great Britain, July 22, 1965, 31,178/65
Int. Cl. G08b 23/00
U.S. Cl. 340—324 7 Claims

ABSTRACT OF THE DISCLOSURE

A graphic display system is disclosed in which a clock pulse generator causes a commutator or stepping register to produce a plurality of sequential output signals. Each such signal is fed to a corresponding matrix row with a selecting switch being coupled by a plurality of lines to corresponding matrix columns. Upon energising an appropriate channel of the selecting switch, signals stored in a particular matrix column representative of a character to be displayed are fed to a CRT deflection means through a filter. Signals read out of the matrix are essentially of step waveform with the filter output comprised of precursor, linear and overshoot portions corresponding to each step input. The high cut-off frequency of the filter substantially equals the timing or clock signal repetition rate while the output supplied to the CRT deflection means in a single clock pulse interval is comprised of the precursor, linear and overshoot portions of the step waves of separate consecutive clock pulse intervals. A beam intensity control means and character position stabilising means are also disclosed.

This invention relates to apparatus for the visual display or recording of symbols, pictorial representations and the like.

One system for controlling a cathode ray tube to display Arabic numerals is described in United States Patent 2,766,444. Two pairs of tapped delay lines generate unique pulse patterns for each numeral. The pulse patterns from each pair of delays are applied to an integrating circuit. The output from one integrating circuit is used as the X deflection voltage for the cathode ray tube, and the output of the other integrating circuit is used as the Y deflection voltage. The pulse patterns are so chosen that the resultant deflection of the cathode ray tube beam traces out the desired numeral.

A character display system of this kind has a variety of uses in connection with telecommunication systems, data processing systems, etc. It may, for example, be used to provide a flexible display for communication between an operator and a computer. The material displayed may be the contents of specified store addresses, or register, intermediate computation results etc., which are required for monitoring purposes, or for fault detection on either the program or the machine. Alternatively, the material may be displayed in the form of a graph, map, or other pictorial representation. Finally, photographic, xerographic, or other known recording techniques may be used in conjunction with the display to provide an output recording system of great speed.

The characters formed by the system described above consist of straight line segments. This leads to a highly stylised form for some of the characters, particularly when the character repertoire is extended to include alphabetic characters, as described in United States Patent 3,104,387. The characters are not so easily distinguished one from another as compared with characters of conventional type fonts. Furthermore, the general appearance of the character is such that, if the display were to be used to provide a permanent record, the result would be unacceptable to many computer users who are accustomed to records produced on conventional type printing mechanisms.

It is the object of the invention to provide greater flexibility in the shapes of symbols, etc., which may be displayed.

According to the invention a graphic display system includes means for generating a pair of step waveforms corresponding to a pattern to be displayed, a pair of frequency selective devices to which the step waveforms are respectively applied, each frequency selective device having a response to an applied step function to produce an output which includes precursor, linear and overshoot portions and having a high frequency cut off which is not substantially higher than the maximum recurrence frequency of the steps in said step waveforms, means for applying the output from the frequency selective devices to beam deflection means of a cathode ray tube and means for applying a beam intensity control signal to the cathode ray tube.

The expression "pattern" is used herein and in the claims as a generic term to describe any pre-determined configuration which it may be desired to display, including digits, alphabetic characters, graphs, maps and the like.

The invention will now be described, by way of example, with reference to the accompanying drawings, in which.

Figure 1:
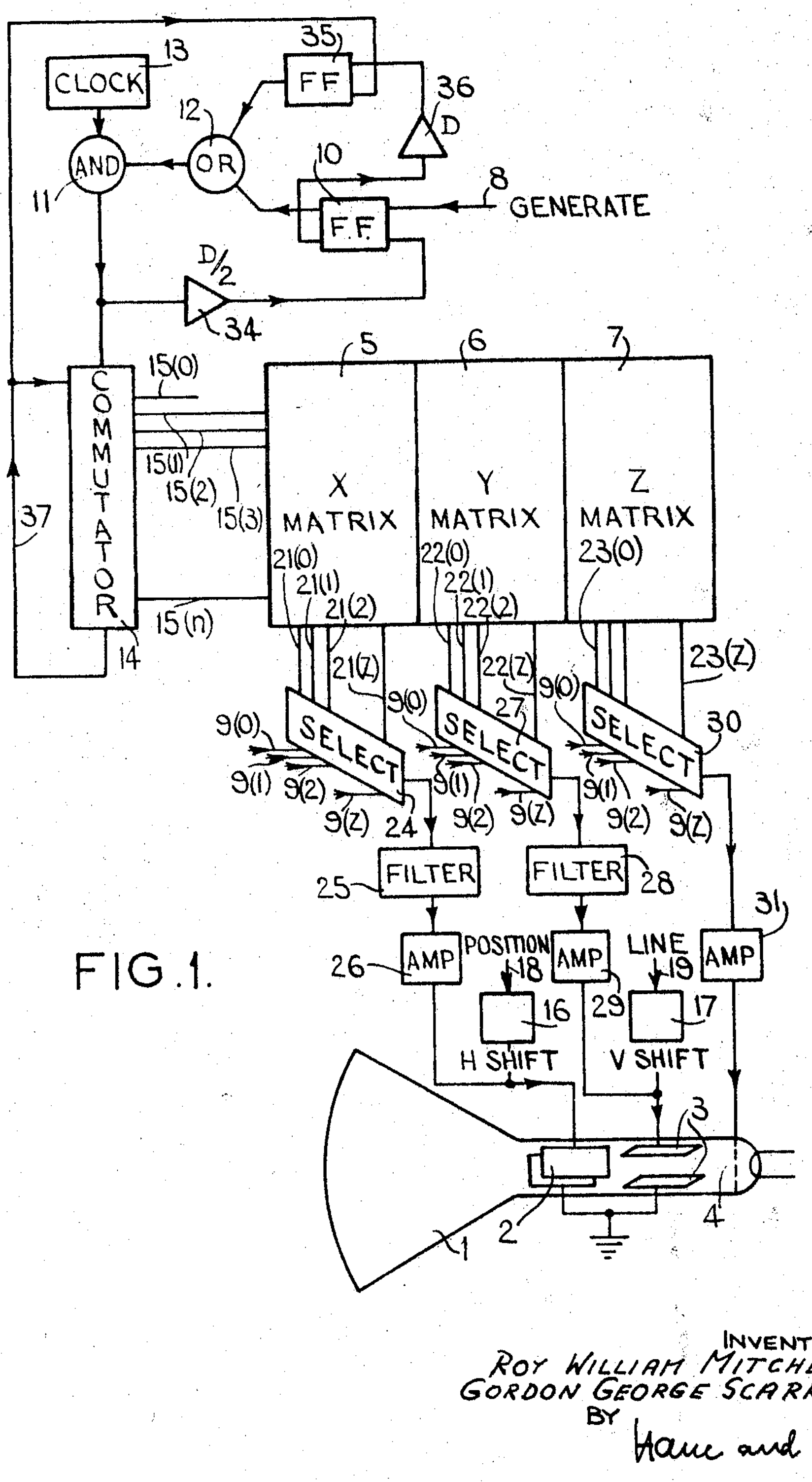
FIGURE 1 is a schematic diagram of a display system.

Referring now to FIGURE 1, patterns are to be displayed on the screen of a cathode ray tube 1, the beam of the cathode ray tube 1 being controlled by signals applied to X and Y deflection electrodes 2 and 3 respectively and to a control grid 4. These signals are respectively derived from three pattern matrices 5, 6 and 7.

The display of a character is initiated by applying a control signal to a generate line 8 and simultaneously applying a character selection signal to the appropriate line of a group of selection lines 9(0) to 9(Z).

The occurrence of the control signal on the line 8 sets a flip-flop 10. The flip-flop 10, when set, applies an output signal, typically referred to as a binary one level output, to an AND gate 11, through an OR gate 12. The AND gate 11 also receives a train of clock pulses at a predetermined frequency from a clock pulse source 13. The next clock pulse in the train to occur after the flip-flop 10 has been set is passed by the AND gate 11 to the input of a stepping register or commutator 14. The first pulse passed by the AND gate 11 is also applied to reset the flip-flop 10 through a delayed circuit 34 which provides a delay of half a clock pulse interval. The flip-flop 10 is thus reset, and the AND gate 11 is closed after passing only a single clock pulse.

However, in resetting, the flip-flop 10 applies an output signal through a delay circuit 36, which provides a delay of approximately one clock pulse interval, to set a further flip-flop 35. When it is set, the flip-flop 35 provides an output signal through the OR gate 12 to reopen the AND gate 11. Thus, the AND gate 11 is initially opened to allow a first clock pulse to pass, is closed to block the passage of the next occurring (second) clock pulse, and is again re-opened to allow the third and succeeding clock pulses to pass to the input of the stepping register 14.

The function of the stepping register 14 is to provide an output signal on each of lines 15(1) to 15($n$) in turn, in response to a succession of pulses applied to the input of the stepping register 14. Thus, after the first clock pulse has passed the AND gate 11, an output signal is produced by the register 14 on the line 15(1), and this signal remains on the line 15(1) during the interruption of the clock pulses while the AND gate 11 is closed. After the AND gate 11 is re-opened, the third and succeeding clock pulses passed by the AND gate 11 cause output signals to appear in turn on the remaining output lines 15(2) to 15($n$) of the register 14 in synchronism with the generation of clock pulses by the source 13. The clock pulse which follows that which causes the output signal on the final line 15($n$) causes the output to be recirculated to a rest position in which an output is applied to a dummy output 15(0). At the same time the recirculation of the register 14 to its initial rest position causes a signal to appear on a line 37 which is passed to reset the flip-flop 35. Resetting of the flip-flop 35 causes the AND gate 11 to be closed to cut off the clock pulses from the register 14. Thus, one complete cycle for the generation of a pattern to be displayed is brought to an end.

Before considering in detail the generation of a typical pattern to be displayed it will be realised that a large number of characters may need to be displayed simultaneously in some of the likely applications of the display system. Accordingly, it is necessary to provide means for coarse positioning of the cathode ray tube beam, so that any particular character can be displayed on a desired line and at the correct position within that line. It will be appreciated that the characters of a multi-character display are in fact generated one after another, and the effect of a simultaneous visual display results from the repeated cyclic generation of the display at a rate high enough to avoid flicker effects, and/or the afterglow characteristics of the cathode ray tube screen.

Circuits for the coarse positioning of the beam are well known in the art, and such circuits are indicated by the blocks 16 and 17, the pattern producing waveforms to be described being superimposed on the outputs from the circuits 16 and 17. Typically, the circuit 16 generates a staircase waveform under control of pulses on position input line 18. The steps of the staircase waveform are all equal, in the simplest case, and are such that the beam is moved horizontally by the distance between the centre lines of adjacent characters in the display for each step. Proportional spacing instead of uniform spacing, may be required if the display is to be used to produce the basic recording for photo-typesetting, for example. Such spacing can be produced by varying the amplitude of the step in accordance with the character width, the control pulses on the line 18 carrying character width information by means of duration, or code modulation. The necessary modulation of the control pulses may be generated by a computer, for example, from which the information to be displayed is also derived.

The circuit 17 also produces a staircase waveform, the amplitude of each step being that necessary to produce a beam shift equal to the desired line spacing. The circuit is operated by control pulses on line 19, a pulse being provided by the computer, or other information source, at the beginning of each line of the display.

Figure 3:
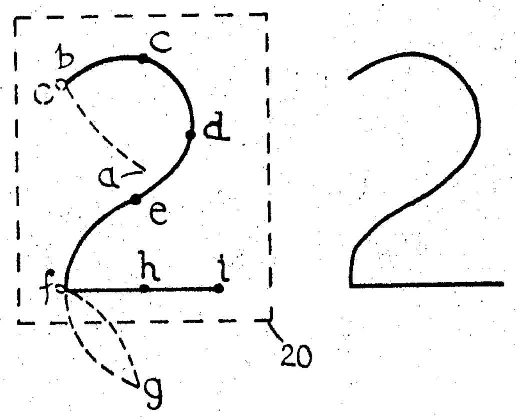
FIGURE 3 shows a typical character.
Figure 4:
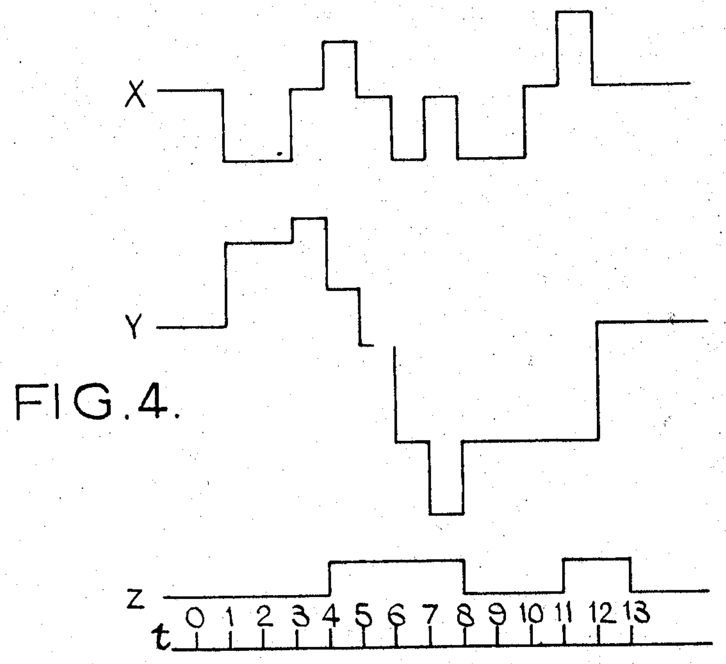
FIGURE 4 is a timing diagram showing typical waveforms related to the character of FIGURE 3.

Referring now to FIGURES 3 and 4 the detailed generation of a typical pattern including a character will be considered. It will be assumed that the character is to be displayed in a predetermined one of a number of positions on the screen of the cathode ray tube, and it is convenient to regard the position as bounded by an imaginary rectangular character frame 20. The frame size is the same for all characters to be displayed if uniform spacing of characters is used, although the width of the frame will vary for different characters if proportional spacing is used. It is assumed, for the purpose of the present explanation, that the coarse positioning circuits 16 and 17 move the beam to the centre of the frame 20 in which the particular character is to be displayed. Thus, before the generation of the character begins, the beam is located at a starting point $a$ within the frame 20. Any other arbitrary starting point, such as the top left-hand corner of the frame, may be used. As will become apparent, a different starting point merely requires corresponding alterations in the form of the waveforms generated by the matrices 5 and 6.

Considering now the detailed generation of a particular character, such as the character "2" shown in FIGURE 3, it will be recalled that the generate signal on line 8 (FIGURE 1) causes a clock pulse to be fed to the register 14. This pulse steps the register 14 on one position, so that the output signal is removed from the dummy line 15(0) and an output signal appears on the line 15(1). This stepping of the output signal is usually and alternatively described by referring to the line 15(0) returning to the binary zero level, and the line 15(1) switching from the binary zero to the one level.

The lines 15(1) to 15($n$) are connected to the row lines of all three matrices 5, 6 and 7. Each matrix has as many column output lines as there are different symbols to be displayed. The output lines 21(0) to 21(Z) of the matrix 5 are connected to a conventional switching circuit 24, using diodes, for example, which is controlled by signals on the selection lines 9(0) to 9(Z). Since the character to be displayed is "2," the character selection signal will hold the line 9(2) at the one level, and this causes the switching circuit 24 to pass signals from line 21(2) to a frequency selective filter circuit 25. The output of the filter circuit 25, is fed, via an amplifier 26, to one horizontal deflection plate 2 of the cathode ray tube 1, the second horizontal deflection plate being grounded in the conventional manner.

Signals from the matrix 6 are selected, in a similar manner, by switching circuit 27 and fed, via a frequency selective filter 28 and amplifier 29 to one vertical deflection plate 3 of the cathode ray tube. A further switching circuit 30 selects the signals from the matrix 7. The output from the switching circuit 30 is fed, via an amplifier 31, to the control grid 4 of the cathode ray tube.

Thus, the complete succession of outputs from the register 14 over the line 15 produces from each of the matrices 5 and 6 a step waveform, the maximum frequency of the steps in the waveform corresponding to the frequency of the clock pulses which cause the stepping register 14 to scan the matrices. It will thus be appreciated that the matrices 5 and 6 store components of the characters to be displayed as representations in mutually perpendicular form respectively, of a series of points along the outline to be displayed, and that the pair of waveforms for the display of a particular character are rendered effective by the selection of the appropriate one of the character selection lines 9. Concurrently, with the generation of the waveform produced by scanning the matrices 5 and 6, a beam intensity (or "bright-up") control waveform is generated in a similar manner by scanning the matrix 7.

Figure 2:
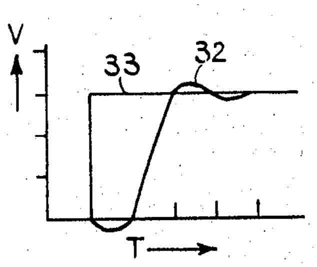
FIGURE 2 shows a response characteristic of a filter used in the system.

The filters 25 and 28 have a response characteristic as shown schematically in FIGURE 2, in which voltage in arbitrary divisions is plotted vertically and time in clock pulse intervals is plotted horizontally. Curve 32 shows the form of signal appearing at the output of one of the filters 25 or 28 in response to a step waveform 33 which is applied to the input. The response consists essentially of three portions; a negative precursor during the first clock pulse interval following the step, a substantially linear rise during the second clock pulse interval, and an overshoot during the third clock pulse interval. This characteristic approximates to that of a damped, phase-corrected low pass filter with high frequency lift. The filter characteristic is shown as providing a delay of exactly one clock pulse interval. This simplifies the system because the filter output is still in synchronism with the basic clock pulse timing. However, the filter delay may be other than an integral of the clock pulse interval; the correct relative timing being obtained by the insertion of suitable delay circuits, for example, in the appropriate parts of the system, such as the output from the matrix 7 and the circuit which terminates the symbol generation cycle. It will also be seen that the linear portion of the response has a duration substantially equal to the clock pulse integral, so that the linear portions of the outputs from steps produced by succeeding clock pulses follow one another with substantially no intervals between.

The output signal from the switching circuits 24 and 27 is a stepped waveform with transitions occurring only at clock pulse times. Hence, the maximum recurrence frequency of the waveform is equal to the frequency of the clock pulses. Typical waveforms are referenced as X and Y in FIGURE 3, being representations of the waveforms for generating the character "2." Such waveforms may conventionally be obtained by connecting resistors between the lines 15 and the lines 21 and 33, (FIGURE 1), the values of the resistors being such that the standard amplitude of voltage step on any of the lines 15, which step is produced by switching of the associated stage of register 14, appears as a step of the desired amplitude on the matrix output lines. The matrix 7 may also be a resistor matrix. The output waveform from this matrix which controls the beam intensity is conveniently of binary form since the beam is either to produce a bright trace, or no trace at all, so that the resistors are all the same value, there being no connection between particular row and column lines if no corresponding output is required. The resistor matrices may conveniently be manufactured by known printed circuit and thin film deposition techniques.

The lines 15 are shown, for the sake of clarity, as single lines, but in this particular embodiment each represents a pair of lines. The waveforms X and Y (FIG. 3) are bi-polar, so that it is necessary for each stage of the commutator to provide separate complementary outputs. Thus, when the corresponding stage of the commutator is set, a positive voltage step appears on one of the pair of lines represented by 15(1), and a complementary negative voltage step appears on the other line of the pair.

Reverting now to detailed consideration of the tracing of a typical pattern, the display of the character "2" will now be described with reference to FIGURES 3 and 4. The time scale in FIGURE 4 represents clock pulse intervals, the first pulse to the input of the commutator 14 occurring at $t_1$. The stepping of the register 14 produces positive and negative steps which are modified in amplitude by the matrices 5 and 6 and appear at the inputs of the filters 25 and 28 respectively as the initial steps shown in FIGURE 4 by waveforms X and Y. It will be recalled that the filters cause a delay of one clock pulse interval. Accordingly, the amplifiers 26 and 29 will provide a linearly rising output voltage between $t_2$ and $t_3$ in response to the input steps at $t_1$. The amplitude of the steps is such that the beam will be moved from point *a* to point *b* (FIGURE 3) during the interval $t_2$ to $t_3$. Dotted and solid lines are used within the frame in FIGURE 3 to show that the beam is suppressed and brightened, respectively. The character to the right of the frame shows, in enlarged form, the display which will be visible on the screen of the cathode ray tube.

The overshoot from the initial step will occur between $t_3$ and $t_4$. This overshoot is prevented from affecting the beginning of the character outline by delaying the start of tracing of the character by one clock pulse interval. This delay is achieved by the suppression, as described, of the second clock pulse by the AND gate 11. Thus the clock pulse $t_2$ is not passed to the register 14.

The overshoot voltage between $t_3$ and $t_4$ causes the beam to execute a small circular movement, returning to the point *b*. There is no substantial change of output from the step at $t_1$ after the overshoot period, so that the beam may be regarded as being stabilised at the commencement of the character at point *b* by $t_4$, ready to start tracing the character.

The clock pulse at $t_3$ drives the commutator on the stage, so that a step appears on line 15(2). As a result, a positive step is applied to the inputs of both filters, as shown in FIGURE 4. A further step occurs at $t_4$ due to the next clock pulse driving the commutator on a further stage, and so on.

The output of amplifiers 26 and 29 during the interval $t_4$ to $t_5$ will be the resultant of the linear rise due to the step at $t_3$ and the negative precursor due to the step at $t_4$. This produces the slightly curved trace from point *b* to point *c*. The matrix 7 produces a signal at $t_4$, as shown in waveform Z (FIGURE 4), which is applied to the control grid 4 of the cathode ray tube, via the amplifier 31. The output from the amplifier 31 has caused the trace to be blacked out prior to $t_4$ and the positive step at $t_4$ acts as a bright-up pulse, so that the beam paints from *b* to *c*.

The output of the amplifiers 26 and 29 during the interval $t_5$ to $t_6$ will be the resultant of the linear rise due to the step at $t_4$, the negative precursor from the step at $t_5$, and the overshoot from the step at $t_3$. The matrix 7 produces a further step at $t_5$, so maintaining the bright-up voltage, and the character outline is traced from point *c* to point *d*.

In a similar manner, the beam moves from *d* to *e* and from *e* to *f* during the intervals $t_6$ to $t_7$ to $t_7$ to $t_8$, respectively.

During $t_8$ to $t_9$, the beam moves from *f* to *g*. The point *g* is the mirror image of the point *e* in the line *fi*. This symmetry ensures that the portion *ef* of the trace joins the portion *fi* at right angles. The signal from matrix 7 switches to its low value at $t_8$, so the the trace is blacked out. The beam returns from *g* to *f* during $t_9$ to $t_{10}$ and is held at *f* during $t_{10}$ to $t_{11}$. The beam is held at *f* for one clock pulse period to stabilise the beam at this point, comparable with the previously described stabilisation at point *a*.

The beam moves from *f* to *h* and from *h* to *i* during the periods $t_{11}$ to $t_{12}$ and $t_{12}$ to $t_{13}$, respectively. The matrix 7 provides a high ouput during this time, so that the trace is visible during this movement.

The tracing of the character is completed when the beam reaches the point *i*.

It has been found that the digits 0–9 and the capital letters A–Z can be displayed with good shape and clarity using the same number of positioning steps as described above for the formation of the digit "2." This number of positioning steps is ten for the actual formation of the symbol, together with two further steps for moving the beam from the starting position to the beginning of the character outline. In this case, then the register 14 consists of one stage which is the rest position, one stage for initial positioning, ten stages for symbol forming, and one stage for providing the bright-up voltage for the last period of symbol formation, or a total of thirteen stages.

It will be realised that the register 14 may have other than thirteen stages. For example, the number of commutator stages may be reduced to twelve if the output of the marix 7 is fed through a delay circuit providing a delay of one clock pulse period, allowing the Z waveform to be generated in phase with the X and Y waveforms.

The number of steps required for symbol forming is dependent upon the complexity of the shapes of the symbols and the accuracy with which these shapes are to be reproduced. For example, the shape of the "2" would not be greatly degraded if the excursion to point *g* was omitted, the beam merely being stabilised at point *f* for one period before moving to point *h*. This representation would require eight steps only. Other symbols may require more than ten steps to produce an acceptable representation.

It is possible that the minimum number of steps necessary for forming the different symbols of a set may cover quite a wide range. It may then be more economical to choose the number of register stages to be sufficient for the formation of the majority of symbols. The remainder of the symbols which require more steps, could then be formed by utilising two scans of the commutator. The matrices 5, 6, 7 would in this case, each be split into two parts, one part being operative on each scan. The control circuit would also be modified by suitable gating so that the flip-flop 35 is reset after the second scan, instead of the first, if any one of this minority of symbols is selected for display.

It will be realised that the remaining circuit elements shown in schematic form in FIGURE 1 are well known in the art, and that it is therefore not necessary to describe these circuit elements in detail. For example, the stepping register 14 may take the form of a ring counter or switching commutator, or may be a re-circulating shift register, consisting of a series of separate stages, in which only one stage is set to produce an output at any time, and in which the set condition is stepped from stage to stage in response to shifting signals, the clock pulses gated by the AND gate 11 in this case being passed to the shift control line of the register.

The stepped waveforms shown in FIGURE 4 have been described as produced by resistor matrices. It will be appreciated, however, that these waveforms may be produced by other circuit arrangements. For example, an extension of the tapped delay line technique, described in United States Patent 2,766,444, may be used, the various amplitude steps being obtained by analogue addition of the outputs from two or more delay lines. Alternatively, the output lines 15 from the register 14 and the selection lines 9 may control a switching matrix of, say, diodes, the output lines of the matrix being each connected to one of a group of circuits which generate steps of different amplitude.

In particular, it will be realised that the waveforms X and Y are shown as bi-polar, because the starting point for the cathode ray tube beam with reference to the frame 20 (FIGURE 3) containing a character is described as lying within the character outline. If, however, the starting point lies outside the character outline, for example, in one corner of the frame 20, then the step waveforms are required to be of one polarity only. It is also possible to employ a starting point which is not fixed with respect to the frame 20. For example, the position of the starting point may be a function of the previously displayed character. This variable starting point may be convenient if the successive symbols are to be joined, as in the simulation of handwriting, but is not necessary for the more usual presentation of characters.

The waveform Z has been described as producing a bright-up signal at those points where the trace of the cathode ray tube beam is required to be visible. It will be realised that the cathode ray tube circuit may be arranged so that the trace is normally visible and the waveform Z is then required to provide a black-out signal except where the beam is tracing the character outline. In this case, the matrix 7 is required to provide a waveform complementary to that shown.

It will be appreciated that the system is not limited to the displaying of patterns comprising symbols, such as letters, digits, etc. It may equally well be used for the display of pictorial representations such as maps, printed circuit card layouts, etc. For such applications, the information specifying the display would usually be derived directly from a data processor, so that the matrices, selection circuits and commutator would be unnecessary. For example, the computer might generate a succession of pairs of binary numbers corresponding to successive beam positions. The numbers would operate a pair of digital to analogue converters, the output from which would be voltage steps, the amplitude of each being defined by a corresponding one of the binary numbers. These voltage steps would be applied to the inputs of the frequency selective filters.

It will be understood that the response characteristics shown in FIGURE 2 may be obtained by conventional filters using passive circuit elements. However, the required characteristic may be obtained in other ways, for example, by means of an amplifier with a negative feedback loop having a non-linear frequency response. It is essential only that the characteristic should have precursor and overshoot regions to provide a smooth transition between segments and to allow the representation of curves, a substantially linear centre section to avoid excessive variations in trace brilliance, and an absence of discontinuities in the characteristic which would produce kinks in the trace.

It is necessary that the points such as *b*, *c*, *d*, etc., which define the symbol shape, should be approximately equidistant to maintain uniform trace brilliance. If it were necessary to use non-equidistant points for some reason, the trace brilliance could be maintained by generating a beam intensity waveform consisting of a bright-up voltage which is proportional to the distance between each pair of adjacent points, instead of a binary voltage.

The best compromise between high definition and smoothness of the symbol outline is obtained when the high frequency cut off of the filters is approximately equal to the maximum recurrence frequency of the step waveforms. If the cut off frequency is too high, there will be very little smoothing and the character outlines will tend towards the angular shapes described in the United States specifications already referred to. If the cut off frequency is too low, the smoothing will be so great that individual steps will have little effect and the result is similar to using fewer steps than are actually being used.

The bright-up waveform Z may be generated from the X and Y waveforms if they have some characteristic which differentiates between those parts which are used for beam positioning and those parts which are used for symbol forming. Such a characteristic might be the amplitude or duration of the steps. For example, the positioning steps might be of greater amplitude, or of shorter duration, than character forming steps, and suitable circuits would then provide an output which occurred only for one kind of step.

It will also be appreciated that the duration of the bright-up waveform may be variable, so that a part only of the trace resulting from a step may be made visible. This may provide a reduction in the number of character forming steps in some cases, and may also be useful in the representation of diagrams and the like.

What is claimed is:

1. A graphic display system including a cathode ray tube having means for producing an electron beam and a screen responsive to the electron beam to display visual images and having beam intensity control means and mutually perpendicular beam deflection means; means for generating timing pulses at a predetermined repetition frequency; waveform generating means controlled by the timing pulse generating means including means for generating a pair of step waveforms corresponding to a pattern to be displayed and means for concurrently generating a beam intensity control waveform; a pair of frequency selective devices connected to said means for generating said pair of step waveforms, each frequency selective device being arranged in response to a step in a waveform to produce an output including a precursor, a linear and an overshoot portion, the duration of said linear portion being substantially equal to the clock pulse interval between two successive timing pulses, each frequency selective device output during single clock pulse intervals comprised of the sum of precursor, linear and overshoot signal portions of separate consecutive clock pulse intervals, respectively; means for connecting the outputs of said frequency selective devices respectively to said beam deflection means; and means for connecting said beam intensity control means.

2. A system as set forth in claim 1 in which said pair of step waveforms jointly represent a succession of points lying along the outline of a pattern, further including means for scanning said points in succession under control of said timing pulses.

3. A system as set forth in claim 2 for displaying a selected one from a repertoire of patterns, including means for storing representations of said points along the outlines of all the patterns of the repertoire, the scanning means being effective concurrently to scan all the representations to generate waveforms; and means for selecting only the waveforms associated with the selected pattern to be effective to display the pattern.

4. A system as set forth in claim 2 in which a pattern may be displayed in one of a number of predetermined positions on the screen of said cathode ray tube, the system further including coarse beam positioning means for selecting a starting point for the beam relative to that one of said predetermined positions in which a pattern is to be displayed.

5. A system as set forth in claim 4 in which the pattern to be displayed includes a character and in which said scanning means includes means for temporarily interrupting the scan at at least one predetermined point of said succession to stabilise the electron beam.

6. A system as set forth in claim 5 in which said predetermined point represents the commencement of the character outline and said scanning means includes a stepping register; and means to control the application of said timing pulses to step said stepping register, the control means including gating means operative in response to a display initiating signal to permit a first timing pulse to pass to said stepping register to produce an output from said stepping register effective to cause the beam to be positioned at the commencement of the character outline; first delay means responsive to the passage of said first timing pulse to render said gating means inoperative to prevent the passage of the next occurring timing pulse; and means for re-operating said gating means after the occurrence of said next occurring timing pulse.

7. A system as set forth in claim 1 in which the high cut off frequency of the frequency selective device approximately equals said repetition frequency.

References Cited

UNITED STATES PATENTS

| | | | |
|---|---|---|---|
| 3,110,802 | 11/1963 | Ingham et al. ------ | 340—324.1 |
| 3,289,195 | 11/1966 | Townsend -------- | 340—324.1 |
| 3,333,147 | 7/1967 | Henderson -------- | 340—324.1 |
| 3,364,479 | 1/1968 | Henderson et al. --- | 340—324.1 |

JOHN W. CALDWELL, *Primary Examiner.*

A. J. KASPER, *Assistant Examiner.*

U.S. Cl. X.R.

178—7.8; 315—18